United States Patent
Eyal et al.

(10) Patent No.: US 10,190,940 B2
(45) Date of Patent: Jan. 29, 2019

(54) SPECTRALLY EFFICIENT OPTICAL FREQUENCY-DOMAIN REFLECTOMETRY USING I/Q DETECTION

(71) Applicants: DSIT Solutions Ltd., Givat Shmuel (IL); Ramot at Tel-Aviv University Ltd., Tel Aviv (IL)

(72) Inventors: Avishay Eyal, Givat Shmuel (IL); Haniel Gabai, Hatzor Haglilit (IL); Yakov Botsev, Rishon Lezion (IL); Meir Hahami, Petach Tikva (IL)

(73) Assignees: DSIT Solutions Ltd., Givat Shmuel (IL); Ramot at Tel-Aviv University Ltd., Tel Aviv (IL)

( * ) Notice: Subject to any disclaimer, the term of this patent is extended or adjusted under 35 U.S.C. 154(b) by 0 days.

(21) Appl. No.: 15/520,417

(22) PCT Filed: Nov. 15, 2015

(86) PCT No.: PCT/IB2015/058819
§ 371 (c)(1),
(2) Date: Apr. 20, 2017

(87) PCT Pub. No.: WO2016/075672
PCT Pub. Date: May 19, 2016

(65) Prior Publication Data
US 2017/0307475 A1 Oct. 26, 2017

Related U.S. Application Data

(60) Provisional application No. 62/080,329, filed on Nov. 16, 2014.

(30) Foreign Application Priority Data

Oct. 27, 2015 (IL) .......................................... 242298

(51) Int. Cl.
| | |
|---|---|
| G01M 11/00 | (2006.01) |
| H04B 10/071 | (2013.01) |
| H04B 10/07 | (2013.01) |
| H04B 10/572 | (2013.01) |

(52) U.S. Cl.
CPC .... G01M 11/3172 (2013.01); G01M 11/3181 (2013.01); G01M 11/333 (2013.01);
(Continued)

(58) Field of Classification Search
CPC ......... G01M 11/3172; G01M 11/3181; G01M 11/333; G01M 11/39; H04B 10/572; H04B 10/07; H04B 10/071
(Continued)

(56) References Cited

U.S. PATENT DOCUMENTS 5,062,703 A * 11/1991 Wong ................. G01M 11/3172
356/73.1
9,553,664 B2 1/2017 Horikx et al.
(Continued)

FOREIGN PATENT DOCUMENTS

| DE | 4325758 A1 | 2/1995 |
| JP | H075068 A | 1/1995 |
| JP | 2010060495 A | 3/2010 |

OTHER PUBLICATIONS

International Application # PCT/IB2015/058819 Search Report dated Feb. 24, 2016.
(Continued)

*Primary Examiner* — Juan A Torres
(74) *Attorney, Agent, or Firm* — D. Kligler IP Services Ltd.

(57) ABSTRACT

A system (20) for fiber-optic reflectometry includes an optical source (28, 40), a beat detection module (52, 56) and a processor (36). The optical source is configured to generate an optical interrogation signal that is transmitted into an
(Continued)

optical fiber (24). The beat detection module is configured to receive from the optical fiber an optical backscattering signal in response to the optical interrogation signal, and to mix the optical backscattering signal with a reference replica of the optical interrogation signal using In-phase/Quadrature (I/Q) mixing, so as to produce a complex beat signal having In-phase (I) and Quadrature (Q) components. The processor is configured to sense one or more events affecting the optical fiber by analyzing the I and Q components of the complex beat signal.

24 Claims, 3 Drawing Sheets

(52) U.S. Cl.
CPC ........... *H04B 10/07* (2013.01); *H04B 10/071* (2013.01); *H04B 10/572* (2013.01); *G01M 11/39* (2013.01)

(58) Field of Classification Search
USPC .......................................................... 398/21
See application file for complete search history.

(56) References Cited

U.S. PATENT DOCUMENTS

| | | | |
|---|---|---|---|
| 2013/0094011 A1* | 4/2013 | Barry | G01S 17/08 |
| | | | 356/4.01 |
| 2014/0140691 A1 | 5/2014 | Reaves et al. | |

OTHER PUBLICATIONS

Ito et al., "Long-range coherent OFDR with light source phase noise compensation", Journal of Lightwave Technology, vol. 30, No. 8, pp. 1015-1024, Apr. 15, 2012.

Bar-Am et al., "OFDR with double interrogation for dynamic quasi-distributed sensing", Optics Express, vol. 22, issue 3, pp. 2299-2308, Feb. 1, 2014.

Arbel et al., "Dynamic optical frequency domain reflectometry", Optics Express, vol. 22, No. 8, pp. 8823-8830, Apr. 21, 2014.

Zhang et al., "Distributed optical fiber vibration sensor based on spectrum analysis of Polarization-OTDR system", Optics Express, vol. 16, No. 14, pp. 10240-10247, Jul. 7, 2008.

Juarez et al., "Distributed fiber-optic intrusion sensor system", Journal of Lightwave Technology, vol. 23, No. 5, pp. 2081-2087, Jun. 2005.

Lu et al., "Distributed vibration sensor based on coherent detection of phase-OTDR", Journal of Lightwave Technology, vol. 28, No. 22, pp. 3243-3249, Nov. 15, 2010.

Takada et al., "New measurement system for fault location in optical waveguide devices based on an interferometric technique", Applied Optics, vol. 26, issue 9, pp. 1603-1606, May 1, 1987.

Barnoski et al., "Fiber waveguides: a novel technique for investigating attenuation characteristics", Applied Optics, vol. 15, issue 9, pp. 2112-2115, Sep. 1976.

European Application # 15859673.4 search report dated Jul. 6, 2018.

* cited by examiner

SPECTRALLY EFFICIENT OPTICAL FREQUENCY-DOMAIN REFLECTOMETRY USING I/Q DETECTION

FIELD OF THE INVENTION

The present invention relates generally to fiber-optic reflectometry, and particularly to methods and systems for fiber-optic reflectometry using In-phase/Quadrature (I/Q) detection.

BACKGROUND OF THE INVENTION

Fiber-optic reflectometry techniques are used for detecting and analyzing impairments and events that affect the optical properties of an optical fiber. Various fiber-optic reflectometry techniques are known in the art. Such techniques are described, for example, by Takada et al., in "New measurement system for fault location in optical waveguide devices based on an interferometric technique," Applied Optics, volume 26, issue 9, 1987, pages 1603-1606; by Barnoski and Jensen, in "Fiber waveguides: a novel technique for investigating attenuation characteristics," Applied Optics, volume 15, issue 9, 1976, pages 2112-2115; and by Bar-Am et al., in "OFDR with double interrogation for dynamic quasi-distributed sensing," Optics Express, volume 22, issue 3, 2014, pages 2299-2308, which are incorporated herein by reference.

Additional examples of fiber-optic reflectometry schemes are described by Arbel and Eyal, in "Dynamic optical frequency domain reflectometry," Optics Express, volume 22, issue 8, 2014, pages 8823-8830; and by Zhang and Bao, in "Distributed optical fiber vibration sensor based on spectrum analysis of Polarization-OTDR system," Optics Express, volume 16, issue 14, 2008, pages 10240-10247, which are also incorporated herein by reference.

Some fiber-optic reflectometry techniques are based on Optical Time-Domain Reflectometry (OTDR). OTDR-based schemes are described, for example, by Juarez et al., in "Distributed fiber-optic intrusion sensor system," Journal of Lightwave Technology, volume 23, issue 6, 2005, pages 2081-2087; and by Yuelan et al., in "Distributed vibration sensor based on coherent detection of phase-OTDR," Journal of Lightwave Technology, volume 28, issue 22, 2010, pages 3243-3249, which are incorporated herein by reference.

Other fiber-optic reflectometry techniques are based on Optical Frequency-Domain Reflectometry (OFDR). OFDR-based schemes are described, for example, in the articles by Bar-Am et al. and by Arbel and Eyal, cited above, as well as by Ito et al., in "Long-range coherent OFDR with light source phase noise compensation," Journal of Lightwave Technology, volume 30, issue 8, 2012, pages 1015-1024, which is incorporated herein by reference.

SUMMARY OF THE INVENTION

An embodiment of the present invention that is described herein provides a system for fiber-optic reflectometry. The system includes an optical source, a beat detection module and a processor. The optical source is configured to generate an optical interrogation signal that is transmitted into an optical fiber. The beat detection module is configured to receive from the optical fiber an optical backscattering signal in response to the optical interrogation signal, and to mix the optical backscattering signal with a reference replica of the optical interrogation signal using In-phase/Quadrature (I/Q) mixing, so as to produce a complex beat signal having In-phase (I) and Quadrature (Q) components. The processor is configured to sense one or more events affecting the optical fiber by analyzing the I and Q components of the complex beat signal.

In an embodiment, the optical interrogation signal includes a periodic chirp signal. In a disclosed embodiment, the beat detection module includes a 90° optical hybrid configured to perform the I/Q mixing. In an example embodiment, the beat detection module includes a pair of optical detectors that are configured to detect the I and Q components of the complex beat signal.

In some embodiments, the processor is configured to analyze the complex beat signal by defining in the complex beat signal at least: a first time interval, during which an instantaneous frequency of the optical backscattering signal is guaranteed to be lower than the instantaneous frequency of the reference replica; and a second time interval, during which the instantaneous frequency of the optical backscattering signal is guaranteed to be higher than the instantaneous frequency of the reference replica.

In an example embodiment, the processor is configured to calculate a backscattering profile of the optical fiber by: calculating a first complex frequency-domain transform of the complex beat signal in the first time interval, and retaining only a positive-frequency part of the first complex frequency-domain transform; and calculating a second complex frequency-domain transform of the complex beat signal in the second time interval, and retaining only a negative-frequency part of the second complex frequency-domain transform. In an embodiment, the processor is configured to sense the events in a first part of the optical fiber based on the first complex frequency-domain transform, and to sense the events in a second part of the optical fiber based on the second complex frequency-domain transform.

In some embodiments, the optical source is configured to generate the optical interrogation signal with a scan repetition rate $f_{scan}$, wherein a length of the optical fiber is denoted L, wherein a speed of light in the optical fiber is denoted v, and wherein the processor is configured to sense the event while $f_{scan}L \le v/2$. In an embodiment, the processor is configured to sense the event while $v/4 < f_{scan}L \le v/2$.

In some embodiments, the optical fiber is part of an optical communication system, and the one or more events include a fault in the optical fiber. In other embodiments, the optical fiber is part of a perimeter defense system, and the one or more events include a breach of the perimeter defense system. In yet other embodiments, the optical fiber is installed in a utility infrastructure, and the one or more events include a fault in the utility infrastructure.

There is additionally provided, in accordance with an embodiment of the present invention, a method for fiber-optic reflectometry. The method includes transmitting an optical interrogation signal into an optical fiber, receiving from the optical fiber an optical backscattering signal in response to the optical interrogation signal, and mixing the optical backscattering signal with a reference replica of the optical interrogation signal using In-phase/Quadrature (I/Q) mixing, so as to produce a complex beat signal having In-phase (I) and Quadrature (Q) components. One or more events affecting the optical fiber are sensed by analyzing the I and Q components of the complex beat signal.

There is further provided, in accordance with an embodiment of the present invention, a system for fiber-optic reflectometry. The system includes an optical source, a beat detection module and a processor. The optical source is configured to generate an optical interrogation signal that is transmitted into an optical fiber. The beat detection module is configured to receive from the optical fiber an optical backscattering signal in response to the optical interrogation signal, to mix the optical backscattering signal with a reference replica of the optical interrogation signal so as to produce a beat signal, and to distinguish in the beat signal between (i) a first component in which an instantaneous frequency of the optical backscattering signal is lower than the instantaneous frequency of the reference replica and (ii) a second component in which the instantaneous frequency of the optical backscattering signal is higher than the instantaneous frequency of the reference replica. The processor is configured to sense one or more events affecting the optical fiber by analyzing the first and second components of the beat signal.

There is also provided, in accordance with an embodiment of the present invention, a method for fiber-optic reflectometry. The method includes transmitting an optical interrogation signal into an optical fiber, receiving from the optical fiber an optical backscattering signal in response to the optical interrogation signal, and mixing the optical backscattering signal with a reference replica of the optical interrogation signal, so as to produce a beat signal. A distinction is made in the beat signal between (i) a first component in which an instantaneous frequency of the optical backscattering signal is lower than the instantaneous frequency of the reference replica and (ii) a second component in which the instantaneous frequency of the optical backscattering signal is higher than the instantaneous frequency of the reference replica. One or more events affecting the optical fiber are sensed by analyzing the first and second components of the beat signal.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and systems for fiber-optic reflectometry. The disclosed techniques can be used for implementing various types of sensors for use in a wide variety of applications. Example applications include optical network monitoring, perimeter defense, as well as monitoring of infrastructure such as pipelines, railways and roads, to name just a few.

In the disclosed embodiments, an Optical Frequency-Domain Reflectometry (OFDR) system generates an optical interrogation signal into an optical fiber of length L. The interrogation signal comprises a periodic optical signal whose instantaneous wavelength varies as a function of time and has a repetition rate $f_{scan}$. A backscattering optical signal is received from the fiber in response to the interrogation signal. The system optically mixes the backscattering signal with a reference replica of the interrogation signal to produce a beat signal. The system detects and digitizes the beat signal, and transforms it into the frequency domain, so as to produce a frequency-domain backscattering profile of the fiber. The system then analyzes the backscattering profile depending of the application.

As will be shown below, if the optical mixing and subsequent detection of the beat signal are performed using a real-signal receiver scheme, the fiber length and the scan repetition rate must satisfy $f_{scan}L \leq v/4$, wherein v denotes the speed of light in the fiber. Thus, the longest fiber or fastest scan repetition rate are achieved when $f_{scan}L = v/4$.

In contrast, in embodiments of the present invention the optical mixing and subsequent detection are performed using a complex-signal, In-phase/Quadrature (I/Q) receiver scheme. In some embodiments, the system mixes the backscattering signal with the reference signal using a 90° optical hybrid and detects the beat signal using a pair of balanced optical detectors in quadrature.

As will be explained in detail below, the I/Q detection scheme enables the system to distinguish between positive and negative beat frequencies. As a result, the upper bound on the product $f_{scan}L$ is doubled relative to real-signal detection. In other words, when using the disclosed I/Q scheme, the longest fiber or fastest scan repetition rate are achieved when $f_{scan}L = v/2$.

In summary, the methods and systems described herein use I/Q optical mixing and detection to provide a considerable increase in the achievable scan repetition rate and fiber length, without degradation in spatial resolution or other performance. The disclosed techniques are particularly beneficial in dynamic sensing applications i.e., applications that require sensing with a high update rate.

System Description

Figure 1:
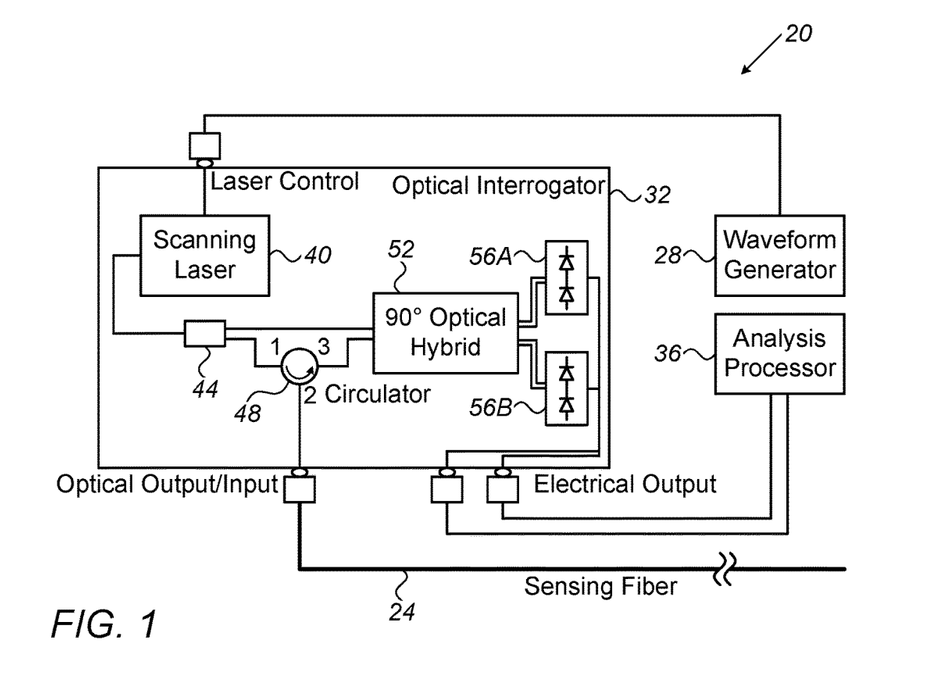
FIG. 1 is a block diagram that schematically illustrates a fiber-optic reflectometry system that uses I/Q detection, in accordance with an embodiment of the present invention.

FIG. 1 is a block diagram that schematically illustrates a fiber-optic reflectometry system 20 that uses I/Q detection, in accordance with an embodiment of the present invention. System 20 transmits an optical signal through an optical fiber 24, referred to as a sensing fiber, and analyzes the optical signal reflected from the fiber.

In particular, system 20 detects backscattering from various reflectors at various points along fiber 24, and estimates the locations along the fiber at which such backscattering occur. Backscattering may be caused by permanent or transient mechanical faults or deformations in the fiber, or by any other suitable phenomenon or event that affects the fiber's optical properties at certain points. Detection and analysis of backscattering may serve as a basis for a wide variety of sensing applications, as will be elaborated below.

In the present example, system 20 comprises a waveform generator 28, an optical interrogation unit 32, and an analysis processor 36. Optical interrogation unit comprises a scanning laser 40, an optical splitter 44, a circulator 48, a 90° optical hybrid 52, and a pair of balanced optical detectors 56A and 56B (also referred to as optical receivers). Hybrid 52 may also be referred to as an I/Q or quadrature hybrid, mixer, demodulator or downconverter.

Waveform generator 28 generates a time-varying waveform that modulates the optical frequency (the wavelength) of laser 40. As a result, laser 40 generates an optical signal whose instantaneous wavelength varies as a function of time. In the present example waveform generator 28 generates signals having a saw-tooth waveform, which cause laser 40 to produce a periodically chirped signal, i.e., a periodic optical signal whose instantaneous wavelength shifts linearly over time. In each period the frequency is swept over a desired frequency range with some predefined sweep rate.

Although the description that follows refers mainly to a linear-chirp optical signal, for the sake of clarity, the disclosed techniques are in no way limited to this sort of signal. In the context of the present patent application and in the claims, the term "chirp signal" refers to any signal whose instantaneous wavelength varies as a function of time. The wavelength may vary in accordance with any suitable function of time, e.g., a linear, polynomial, logarithmic, stepwise, pseudo-random or other function.

Alternatively, laser 40 under the control of waveform generator 28 may produce waveforms of any other suitable scanning signal, e.g., an optical signal whose instantaneous wavelength is a sinusoidal, triangular or other suitable function of time.

The optical signal produced by laser 40 is split using splitter 44 into an interrogation signal and a reference signal. The interrogating signal is launched into sensing fiber 24, and a backscattering signal is received from the fiber in response. The received backscattering signal is mixed with the reference signal to produce a beat signal that is in turn analyzed.

In the example of FIG. 1, the interrogating signal is transmitted via circulator 48 (via ports 1⇒2 of the circulator) into fiber 24. The reference signal (a reference replica of the interrogation signal) is applied to the Local Oscillator (LO) port of hybrid 52. The interrogation signal is reflected (e.g., backscattered) from various points along fiber 24. The superposition of these reflections, which returns from fiber 24 to interrogation unit 32, is an optical signal referred to herein as the backscattered signal. The backscattered signal passes through circulator 48 (via ports 2⇒3 of the circulator) and is applied to the signal port of hybrid 52.

Hybrid 52 has two pairs of output fibers that are connected respectively to balanced optical detectors 56A and 56B. Detectors 56A and 56B produce respective electrical signals that represent the In-phase (I) and Quadrature (Q) components of the beat signal (the backscattered signal after it has been down-converted by mixing with the reference signal). In other words, detectors 56A and 56B produce a complex signal representation of the light backscattered in fiber 24.

The pair of electrical signals (i.e., the complex beat signal) produced by detectors 56A and 56B is provided to analysis processor 36. Processor 36 digitizes the complex beat signal and analyzes it in the frequency domain, so as to detect and localize the points along fiber 24 at which backscattering occurs. Typically, processor 36 transforms the beat signal into the frequency domain, e.g., by applying a Fourier transform, so as to produce a frequency-domain backscattering profile of the fiber. Generally speaking, each beat frequency (and thus each frequency bin of the Fourier transform) is mapped to a respective location along the fiber. The functions of processor 36 are addressed in greater detail further below.

The configuration of system 20 shown in FIG. 1 is an example configuration, which is chosen purely for the sake of conceptual clarity. In alternative embodiments, any other suitable system configuration can be used. In the present context, waveform generator 28 and laser 40 are referred to jointly as an optical source. Hybrid 52 and detectors 56A and 56B are referred to jointly as a beat detection module. In alternative embodiments, system 20 may be implemented using any other suitable configuration of the optical source and/or beat detection module.

The different elements of system 20 may be implemented using various suitable optical and/or electronic hardware components, integrated or discrete. In one example embodiment, fiber 24 comprises a Corning SMF-28fiber, laser 40 comprises a laser by Koheras Adjustik of NKT Photonics™, splitter 44 comprises a TW1550R5A2 device provided by Thorlabs™, circulator 48 comprises a 6015-3-APC device provided by Thorlabs™, hybrid 52 comprises a COH24-X device provided by Kylia™, detectors 56A and 56B comprise PDB470C-AC devices provided by Thorlabs™. In alternative embodiments, however, any other suitable components can be used.

Some system elements, e.g., waveform generator 28, may be implemented using off-the-shelf or modified test equipment. Some system elements, e.g., analysis processor 36, may be implemented using hardware, e.g., using one or more Application-Specific Integrated Circuits (ASICs) or Field-Programmable Gate Arrays (FPGAs), using software, or using a combination of hardware and software elements.

In some embodiments, processor 36 may be implemented using one or more general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Real-Signal Vs. Complex-Signal (I/Q) OFDR Detection and Analysis

Consider a dynamic fiber-optic reflectometry application, in which the fiber deformations or faults that should be detected vary over time. In such applications, the update rate, i.e., the rate with which the backscattering profile is estimated, is often a major design consideration. A trade-off typically exists between the rate at which the interrogation cycles are transmitted (referred to as the scan repetition rate and denoted $f_{scan}$) and the length of the sensing fiber (denoted L). This trade-off is due to the constraint that, following an interrogation cycle, the resulting backscattered signal should fully exit the fiber before the next interrogation cycle begins.

In order to meet this constraint, the scan repetition rate and the fiber length should satisfy $f_{scan}L \leq v/2 = 10^8$ m/s, wherein v denotes the speed of light in the fiber. Thus, with all other parameters fixed, the longest fiber and/or the fastest scan repetition rate are achieved when $f_{scan}L = v/2$.

As explained above, system 20 detects the beat signal (the backscattered optical signal after mixing with the reference optical signal) using I/Q detection rather than using real-signal detection. The I/Q detection scheme provides a superior trade-off of $f_{scan}$, L and the achievable spatial resolution, in comparison with real-signal detection. This performance benefit is demonstrated in FIGS. 2A and 2B below.

Figure 2A:
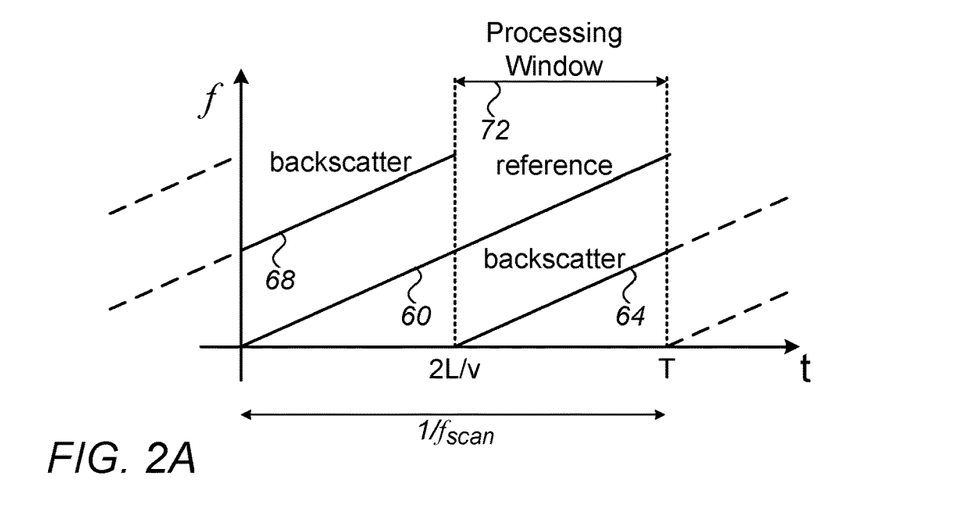
FIG. 2A is a graph showing instantaneous signal frequencies as a function of time in a fiber-optic reflectometry system that uses real-signal detection.
Figure 2B:
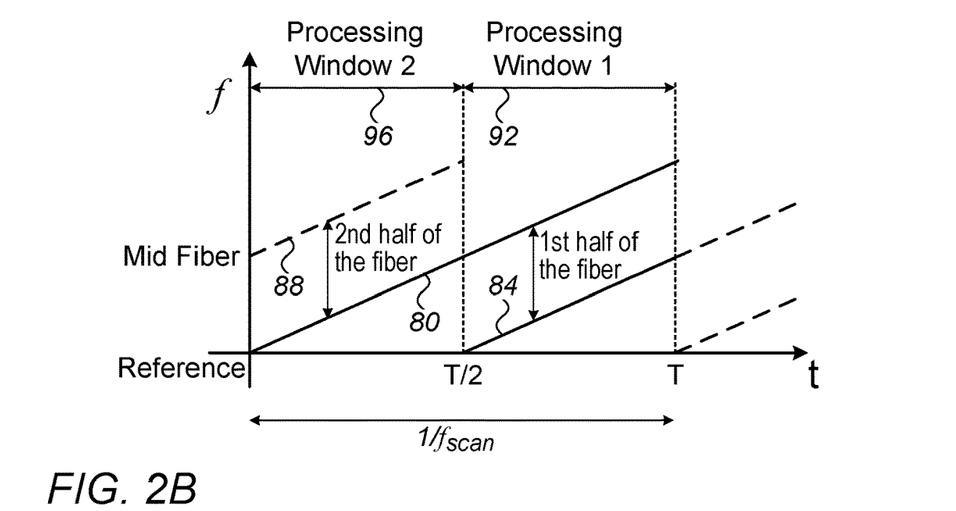
FIG. 2B is a graph showing instantaneous signal frequencies as a function of time in a fiber-optic reflectometry system that uses I/Q detection, in accordance with an embodiment of the present invention.

FIGS. 2A and 2B are graphs showing instantaneous signal frequencies as a function of time for real-signal detection and for I/Q detection, respectively. FIG. 2B illustrates the principle of operation of system 20, in accordance with an embodiment of the present invention. FIG. 2A serves as a baseline for comparison. In both figures, the horizontal axis represents time (t), which is also proportional to the longitudinal coordinate z along the fiber. The vertical axis represents the instantaneous signal frequency (f).

Reference is now made to FIG. 2A, which illustrates a scenario of real-signal detection. A line 60 plots the instantaneous frequency of the reference signal, and lines 64 and 68 plot the instantaneous frequency of the backscattered signal, over the time interval 0≤t≤T, wherein T=1/$f_{scan}$.

A "processing window" 72 is defined as the time interval between t=2L/v and t=T. The processing window is the time interval in the detected beat signal, over which processor 36 estimates the backscattering profile. As noted above, the backscattering profile is typically estimated by calculating a Fourier transform of the beat signal between the backscattered signal and the reference signal.

In the present example, parameters were chosen such that $f_{scan}L=v/4$. This choice guarantees that the instantaneous frequency of the backscattered signal (line 64) is guaranteed to be lower than the instantaneous frequency of the reference signal (line 60) across the entire processing window 72.

Without loss of generality, a beat frequency that is generated when the instantaneous frequency of the backscattered signal is lower than that of the reference signal is referred to herein as a positive beat frequency. Similarly, a beat frequency that is generated when the instantaneous frequency of the backscattered signal is higher than that of the reference signal is referred to herein as a negative beat frequency.

As can be seen in FIG. 2A, $f_{scan}L=v/4$ is the highest performance (longest fiber, fastest scanning) achievable with the real-signal detection scheme. If all other parameters are fixed, any increase in the fiber length L would cause negative beat frequencies to be present in at least part of processing window 72. Since real-signal detection is unable to distinguish between positive and negative beat frequencies, negative beat frequencies in the processing window of FIG. 2A are regarded as aliasing, and distort the calculation of the backscattering profile.

Thus, in the real-signal detection scheme of FIG. 2A, in order to increase the fiber length L it is necessary to either reduce the scan repetition rate $f_{scan}$ or to decrease the size of processing window 72. Both solutions, however, would degrade performance. Reducing $f_{scan}$ degrades the dynamic performance of the system, e.g., the ability to detect temporal changes in the backscattering profile. Reducing the size of the processing window degrades the achievable spatial resolution.

As will be demonstrated using FIG. 2B, the I/Q detection scheme of system 20 enables $f_{scan}L$ to reach the theoretical limit $f_{scan}L=v/2$, without introducing aliasing or degrading spatial resolution. In particular, unlike real-signal-based schemes, system 20 is able to generate and analyze the backscattering profile while $v/4<f_{scan}L\leq v/2$.

In the detection scheme of system 20, sensing fiber 24 can be modeled as a distributed reflector whose reflectivity is denoted R(z), wherein z denotes the longitudinal coordinate along the fiber. The in-phase and quadrature electrical signals at the output of detectors 56A and 56B can be written as:

$$I(t) = a\int_{z=0}^{L} R(z)\cos[2\pi f_{beat}(z,t)t + \varphi(z)]dz$$

$$Q(t) = a\int_{z=0}^{L} R(z)\sin[2\pi f_{beat}(z,t)t + \varphi(z)]dz$$

wherein $\varphi(z)$ denotes the phase accumulated by the interrogation signal in the round-trip to z and back, $f_{beat}(z,t)$ denotes the beat frequency resulting from mixing the signal backscattered from z with the reference signal, and a denotes a scaling factor that depends on the responsivity of detectors 56A and 56B.

The beat frequency during one scan period can be written as:

$$f_{beat}(z,t) = \begin{cases} \gamma 2z/v - \Delta f & 0 \leq t < 2z/v \\ \gamma 2z/v & 2z/v \leq t < T \end{cases}$$

wherein γ denotes the frequency sweep rate of the interrogation signal in [Hz/sec] and v is the speed of light in the fiber. The complex backscattering signal is obtained by taking the sum:

$$V(t) = I(t) + jQ(t) = a\int_{z=0}^{L} \tilde{R}(z)e^{j2\pi f_{beat}(z,t)t}dz$$

wherein $\tilde{R}(z)\equiv R(z)e^{j\varphi(z)}$ denotes the complex reflection coefficient of fiber 24 as a function of z.

Reference is now made to FIG. 2B, which illustrates the signals in system 20 when $f_{scan}L$ is set to the theoretical optimum value $f_{scan}L=v/2$. A line 80 shows the instantaneous frequency of the reference signal. Lines 84 and 88 show the instantaneous frequency of the backscattering signal.

In the case of I/Q detection, two processing windows 92 and 96 are defined in the detected beat signal, each of size T/2. The first processing window (window 92, T/2≤t<T) corresponds to the half of fiber 24 closer to system 20 (0≤z<L/2). Across this window, the beat frequencies are guaranteed to be positive. The second processing window (window 96, 0≤t<T/2) corresponds to the half of fiber 24 that is further away from system 20 (L/2≤z<L). Across this window, the beat frequencies are guaranteed to be negative.

In some embodiments, processor 36 calculates the backscattering profile for the near half of fiber 24 by calculating a Fourier transform of the complex backscattering signal V(t) over the first processing window (window 92, T/2≤t<T), and retaining only the positive-frequency components of the resulting transform.

Similarly, processor 36 may calculate the backscattering profile for the distant half of fiber 24 by calculating a Fourier transform of the complex backscattering signal V(t) over the second processing window (window 96, 0≤t<T/2), and retaining only the negative-frequency components of the resulting transform.

The description of FIG. 2B above refers to the optimum case in which $f_{scan}L=v/2$. The disclosed techniques, however, can also be used in other scenarios and other choices of parameters that meet the condition $f_{scan}L\leq v/2$. As long as this condition is met, processor 36 can divide the detected complex-valued beat signal into one or more first processing windows (in which the beat frequencies are guaranteed to be positive) and one or more second processing windows (in which the beat frequencies are guaranteed to be negative).

In summary, the above comparison between real-signal detection (FIG. 2A) and I/Q detection (FIG. 2B) shows that I/Q detection is able to perform OFDR-based optical-fiber reflectometry while increasing the product $f_{scan}L$ by up to a factor of two. For example, relative to a comparable system that uses real-signal detection, system 20 is able to support twice the fiber length for the same scan repetition rate, or double the scan repetition rate for the same fiber length, without degrading spatial resolution.

The inventors have verified the performance of the disclosed technique using a computer simulation. Description of the simulation setup and example simulation results are provided in U.S. Provisional Patent Application 62/080,329, cited above.

Figure 3:
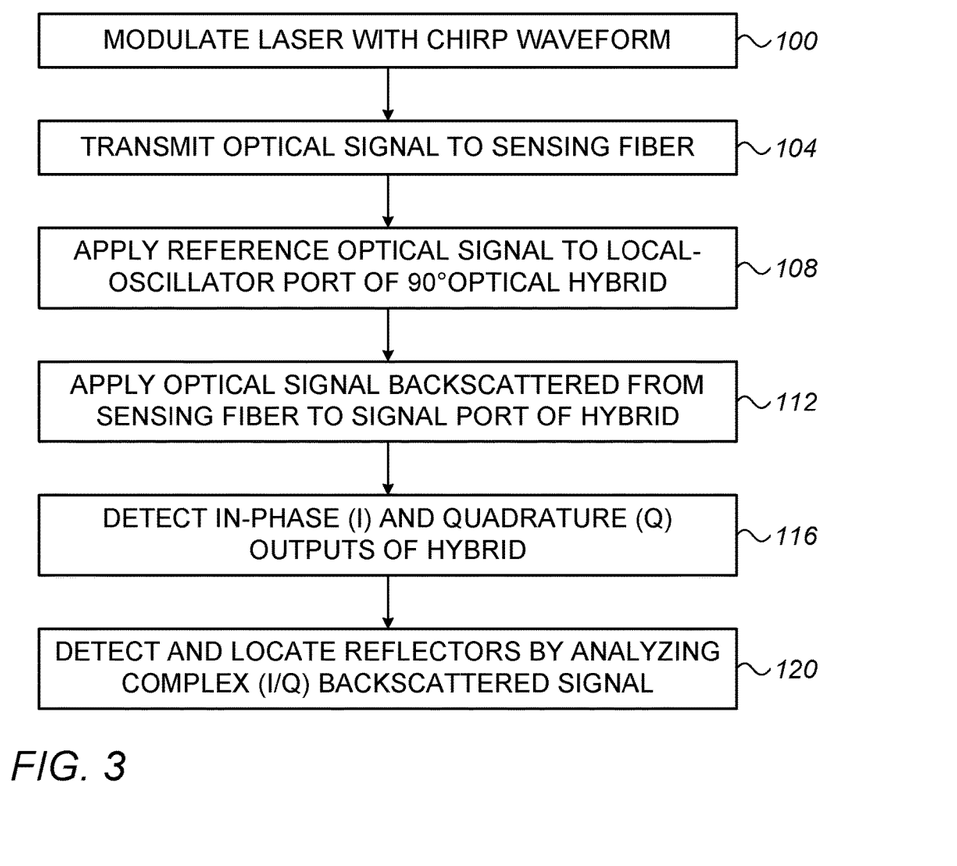
FIG. 3 is a flow chart that schematically illustrates a method for fiber-optic reflectometry using I/Q detection, in accordance with an embodiment of the present invention.

FIG. 3 is a flow chart that schematically illustrates a method for fiber-optic reflectometry using I/Q detection, in accordance with an embodiment of the present invention. The method begins with waveform generator 28 modulating laser 40 with a chirped waveform, at a modulation step 100. As a result, laser 40 generates an interrogation optical signal—A train of interrogating cycles whose instantaneous wavelength varies linearly as a function of time. At a transmission step 104, system 20 transmits the interrogation optical signal into sensing fiber 24.

The reference optical signal is applied to the LO port of hybrid 52, at a reference input step 108. The backscattering optical signal is applied to the signal port of hybrid 52, at a backscattering input step 112. Detectors 56A and 56B detect the I and Q outputs of hybrid 52, respectively, at an I/Q detection step 116. In other words, detectors 56A and 56B output the respective I and Q components of the complex beat signal between the interrogation signal and the reference signal.

At an analysis step 120, processor 36 analyzes the complex beat signal in the frequency domain, as explained above, so as to identify reflections occurring in fiber 24. The analysis may involve, for example, determining the presence, intensity and z coordinates of reflections in fiber 24.

Example Applications

In various embodiments, systems such as system 20 of FIG. 1 can be used in a wide variety of applications that involve detecting various kinds of events that affect an optical-fiber. Typically, although not necessarily, system 20 is used in dynamic sensing applications that benefit from fast update rate.

In some embodiments, system 20 is used for monitoring optical fibers in an optical communication network, for example in order to detect and locate faults in the fibers. In this application, the sensed events are typically faults in the optical fiber that impact the communication performance of the network.

In other embodiments, sensing fiber 24 is installed as part of a perimeter defense system for protecting a certain area or structure. In such applications, the sensed events typically relate to illegitimate entry, i.e., illegitimate breach of the perimeter defense system.

In other embodiments, sensing fiber 24 is installed in some utility infrastructure element, in order to detect fatigue-related faults or other faults in the infrastructure. The fiber may be installed, for example, in an oil or water pipeline, in a railway line or in a road or bridge. In this sort of application, the sensed events are typically related to faults in the infrastructure element.

The applications listed above are depicted purely by way of example. In alternative embodiments, the disclosed techniques can be used as part of any other suitable system and for any other suitable application.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system for fiber-optic reflectometry, the system comprising:
    an optical source, which is configured to generate an optical interrogation signal that is transmitted into an optical fiber;
    a beat detection module, which is configured to receive from the optical fiber an optical backscattering signal in response to the optical interrogation signal, and to mix the optical backscattering signal with a reference replica of the optical interrogation signal using In-phase/Quadrature (I/Q) mixing, so as to produce a complex beat signal having In-phase (I) and Quadrature (Q) components; and
    a processor, which is configured to sense one or more events affecting the optical fiber by analyzing the I and Q components of the complex beat signal, including defining in the complex beat signal at least:
        a first time interval, during which an instantaneous frequency of the optical backscattering signal is guaranteed to be lower than the instantaneous frequency of the reference replica; and
        a second time interval, during which the instantaneous frequency of the optical backscattering signal is guaranteed to be higher than the instantaneous frequency of the reference replica.

2. The system according to claim 1, wherein the optical interrogation signal comprises a periodic chirp signal.

3. The system according to claim 1, wherein the beat detection module comprises a 90° optical hybrid configured to perform the I/Q mixing.

4. The system according to claim 1, wherein the beat detection module comprises a pair of optical detectors that are configured to detect the I and Q components of the complex beat signal.

5. The system according to claim 1, wherein the processor is configured to calculate a backscattering profile of the optical fiber by:
    calculating a first complex frequency-domain transform of the complex beat signal in the first time interval, and retaining only a positive-frequency part of the first complex frequency-domain transform; and
    calculating a second complex frequency-domain transform of the complex beat signal in the second time interval, and retaining only a negative-frequency part of the second complex frequency-domain transform.

6. The system according to claim 1, wherein the optical source is configured to generate the optical interrogation signal with a scan repetition rate $f_{scan}$, wherein a length of the optical fiber is denoted L, wherein a speed of light in the optical fiber is denoted v, and wherein the processor is configured to sense the event while $f_{scan}L \leq v/2$.

7. The system according to claim 1, wherein the optical fiber is part of an optical communication system, and wherein the one or more events comprise a fault in the optical fiber.

8. The system according to claim 1, wherein the optical fiber is part of a perimeter defense system, and wherein the one or more events comprise a breach of the perimeter defense system.

9. The system according to claim 1, wherein the optical fiber is installed in a utility infrastructure, and wherein the one or more events comprise a fault in the utility infrastructure.

10. The system according to claim 5, wherein the processor is configured to sense the events in a first part of the optical fiber based on the first complex frequency-domain transform, and to sense the events in a second part of the optical fiber based on the second complex frequency-domain transform.

11. The system according to claim 6, wherein the processor is configured to sense the event while $v/4 < f_{scan}L \leq v/2$.

12. A method for fiber-optic reflectometry, the method comprising:
    transmitting an optical interrogation signal into an optical fiber;
    receiving from the optical fiber an optical backscattering signal in response to the optical interrogation signal;
    mixing the optical backscattering signal with a reference replica of the optical interrogation signal using In-phase/Quadrature (I/Q) mixing, so as to produce a complex beat signal having In-phase (I) and Quadrature (Q) components; and
    sensing one or more events affecting the optical fiber by analyzing the I and Q components of the complex beat signal, including defining in the complex beat signal at least:
        a first time interval, during which an instantaneous frequency of the optical backscattering signal is guaranteed to be lower than the instantaneous frequency of the reference replica; and
        a second time interval, during which the instantaneous frequency of the optical backscattering signal is guaranteed to be higher than the instantaneous frequency of the reference replica.

13. The method according to claim 12, wherein the optical interrogation signal comprises a periodic chirped signal.

14. The method according to claim 12, wherein mixing the optical backscattering signal with the reference replica comprises performing the I/Q mixing using a 90° optical hybrid.

15. The method according to claim 12, and comprising detecting the I and Q components of the complex beat signal using a pair of optical detectors.

16. The method according to claim 12, wherein analyzing the complex beat signal comprises calculating a backscattering profile of the optical fiber by:
    calculating a first complex frequency-domain transform of the complex beat signal in the first time interval, and retaining only a positive-frequency part of the first complex frequency-domain transform; and
    calculating a second complex frequency-domain transform of the complex beat signal in the second time interval, and retaining only a negative-frequency part of the second complex frequency-domain transform.

17. The method according to claim 12, wherein transmitting the optical interrogation signal comprises transmitting the optical interrogation signal with a scan repetition rate $f_{scan}$, wherein a length of the optical fiber is denoted L, wherein a speed of light in the optical fiber is denoted v, and wherein sensing the event comprises sensing the events while $f_{scan}L \leq v/2$.

18. The method according to claim 12, wherein the optical fiber is part of an optical communication system, and wherein sensing the events comprises sensing a fault in the optical fiber.

19. The method according to claim 12, wherein the optical fiber is part of a perimeter defense system, and wherein sensing the events comprises sensing a breach of the perimeter defense system.

20. The method according to claim 12, wherein the optical fiber is installed in a utility infrastructure, and wherein sensing the events comprises sensing a fault in the utility infrastructure.

21. The method according to claim 16, wherein sensing the events comprises sensing the events in a first part of the optical fiber based on the first complex frequency-domain transform, and sensing the events in a second part of the optical fiber based on the second complex frequency-domain transform.

22. The method according to claim 17, wherein sensing the event comprises sensing the events while $v/4 < f_{scan}L \leq v/2$.

23. A system for fiber-optic reflectometry, the system comprising:
    an optical source, which is configured to generate an optical interrogation signal that is transmitted into an optical fiber;
    a beat detection module, which is configured to receive from the optical fiber an optical backscattering signal in response to the optical interrogation signal, to mix the optical backscattering signal with a reference replica of the optical interrogation signal so as to produce a beat signal, and to distinguish in the beat signal between (i) a first component in which an instantaneous frequency of the optical backscattering signal is lower than the instantaneous frequency of the reference replica and (ii) a second component in which the instantaneous frequency of the optical backscattering signal is higher than the instantaneous frequency of the reference replica; and
    a processor, which is configured to sense one or more events affecting the optical fiber by analyzing the first and second components of the beat signal.

24. A method for fiber-optic reflectometry, the method comprising:
    transmitting an optical interrogation signal into an optical fiber;
    receiving from the optical fiber an optical backscattering signal in response to the optical interrogation signal;
    mixing the optical backscattering signal with a reference replica of the optical interrogation signal, so as to produce a beat signal;
    distinguishing in the beat signal between (i) a first component in which an instantaneous frequency of the optical backscattering signal is lower than the instantaneous frequency of the reference replica and (ii) a second component in which the instantaneous frequency of the optical backscattering signal is higher than the instantaneous frequency of the reference replica; and
    sensing one or more events affecting the optical fiber by analyzing the first and second components of the beat signal.

* * * * *